United States Patent [19]

Montemayor Uzeta

[11] Patent Number: 4,986,907
[45] Date of Patent: Jan. 22, 1991

[54] FUEL PURIFYING APPARATUS

[76] Inventor: Luis A. Montemayor Uzeta, Avenida Topochico 801, Col. Anahuac, San Nicollás de los Garza, Nuevo León, Mexico

[21] Appl. No.: 305,277

[22] Filed: Feb. 1, 1989

[51] Int. Cl.$^5$ .......................................... B01D 17/028
[52] U.S. Cl. ..................................... 210/179; 210/187; 210/312.1; 210/519; 210/533; 210/540; 123/514; 123/516; 123/557; 219/205
[58] Field of Search ............... 210/175, 180, 181, 187, 210/304, 305, 512.1, 533, 179; 123/514, 516, 557; 219/205

[56] References Cited

U.S. PATENT DOCUMENTS

| | | | |
|---|---|---|---|
| 3,362,534 | 1/1968 | Kay | 210/305 |
| 3,931,011 | 1/1976 | Richards et al. | 210/304 |
| 4,091,265 | 5/1978 | Richards et al. | 123/557 |
| 4,495,069 | 1/1985 | Davis | 210/181 |
| 4,789,098 | 12/1988 | Shepherd | 123/557 |

Primary Examiner—W. Gary Jones
Assistant Examiner—Matthew O. Savage
Attorney, Agent, or Firm—Ladas & Parry

[57] ABSTRACT

The invention is related to a fuel purifying apparatus, especially diesel fuel, which consists in a hollow cylindrical body that has a fuel intake orifice and an exit orifice through which the fuel, respectively, enters the apparatus to be purified, and leaves in the direction of the vehicle engine with increased purity properties; a fuel flow conduit in fluid communication with the intake orifice, solidly arranged on the inner wall of the cylindrical body and whose fuel discharge orifice is next to a metal deflector plate that extends diametrally and also substantially in a longitudinal manner, in the interior of the cylindrical body; and an electric heating element that partially penetrates the cylindrical body through an insertion orifice made in said body, the inner end of the heating element being near the deflector plate to heat it. In addition, the apparatus incorporates drainage elements for withdrawing from the apparatus the impurities separated out of the fuel.

7 Claims, 4 Drawing Sheets

FUEL PURIFYING APPARATUS

It is well known that the qualitative properties of the fuels used around the world by automotive vehicles are by no means the best in the world. This means that the owner of any vehicle is affected by premature wear and tear on the engine of his automobile, and in the end, he is affected economically.

Without pretending to do a study of the fuels used in internal combustion engines, we want to emphasize their very poor quality due to high contents of sulfur, paraffin and sulfuric acid among other components which harm the use life of the internal combustion-engines of automotive vehicles. To the foregoing, we can add the dust or dirt that is introduced into the gas tank during the normal filling operation.

In addition to the above, the metallic nature of storage tanks together with the layer of water condensation that commonly forms on the upper, interior surface of the tank, causes the oxides which, when mixed with the diesel fuel, impoverish its capacity still more.

A purpose of this invention is to provide a diesel refining apparatus that will be placed between the fuel storage tank and the primary filter of an automotive vehicle in order to refine the diesel fuel through separation of the impurities or foreign components from the diesel (water, oxides, sulfur, etc.) existing in it in such a way that the diesel received in the injection system of the engine via the primary filter has optimal qualitative conditions for generating greater yield and duration of the vehicle's engine.

Some sheets of drawings are included for better illustration and understanding of this invention, on which FIG. 1 is a conventional perspective view of the fuel refining apparatus.

DETAILED DESCRIPTION OF THE INVENTION

Figure 1:
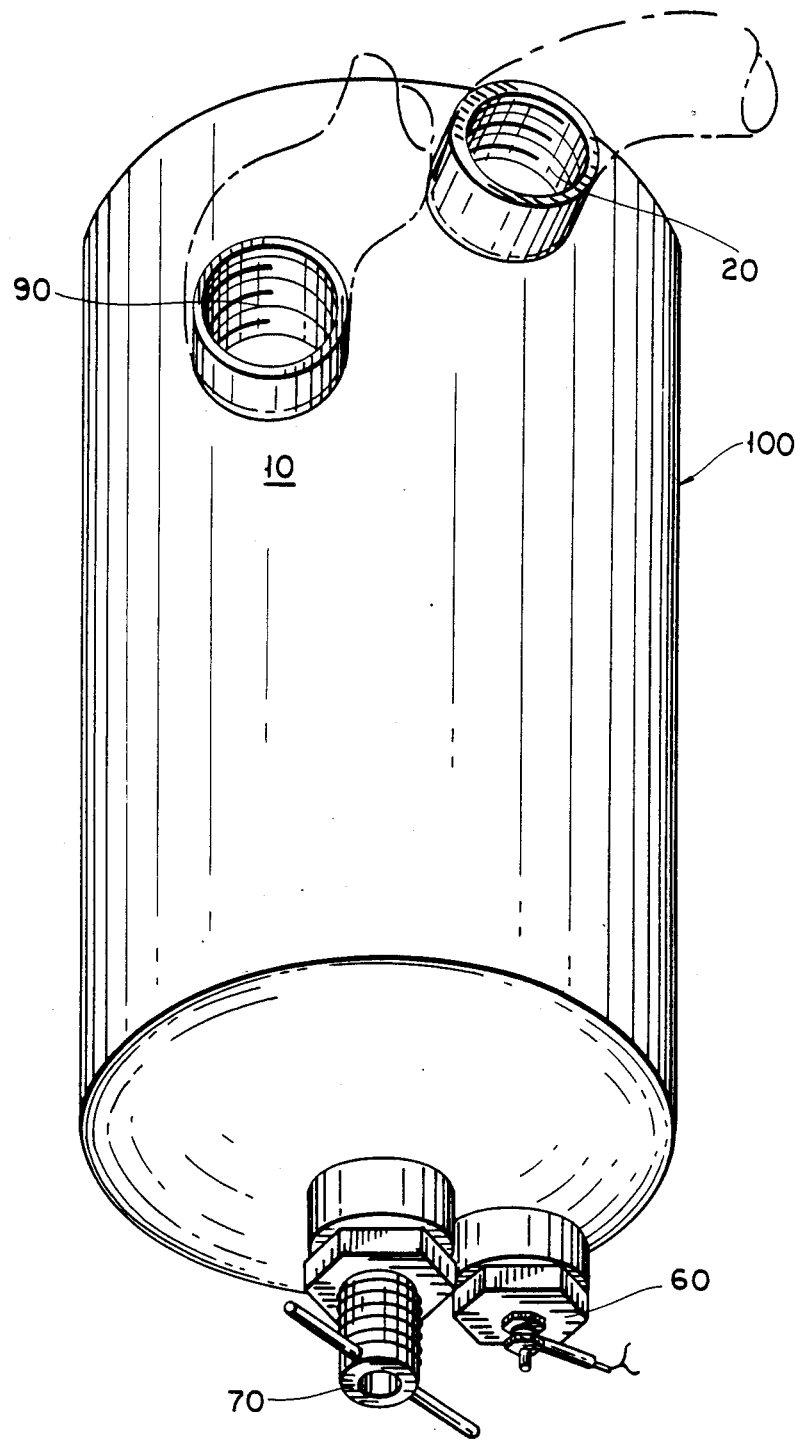
Figure 2:
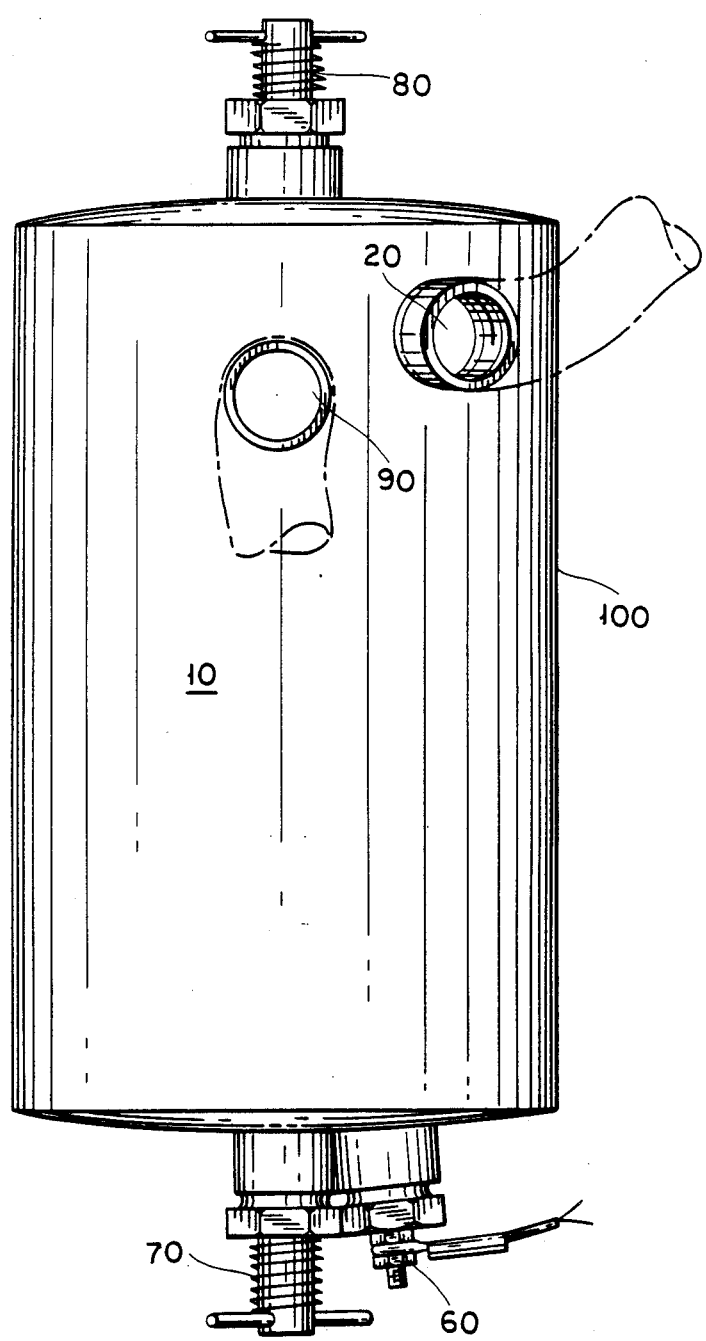
FIG. 2 is a side view of the apparatus of this invention.
Figure 3:
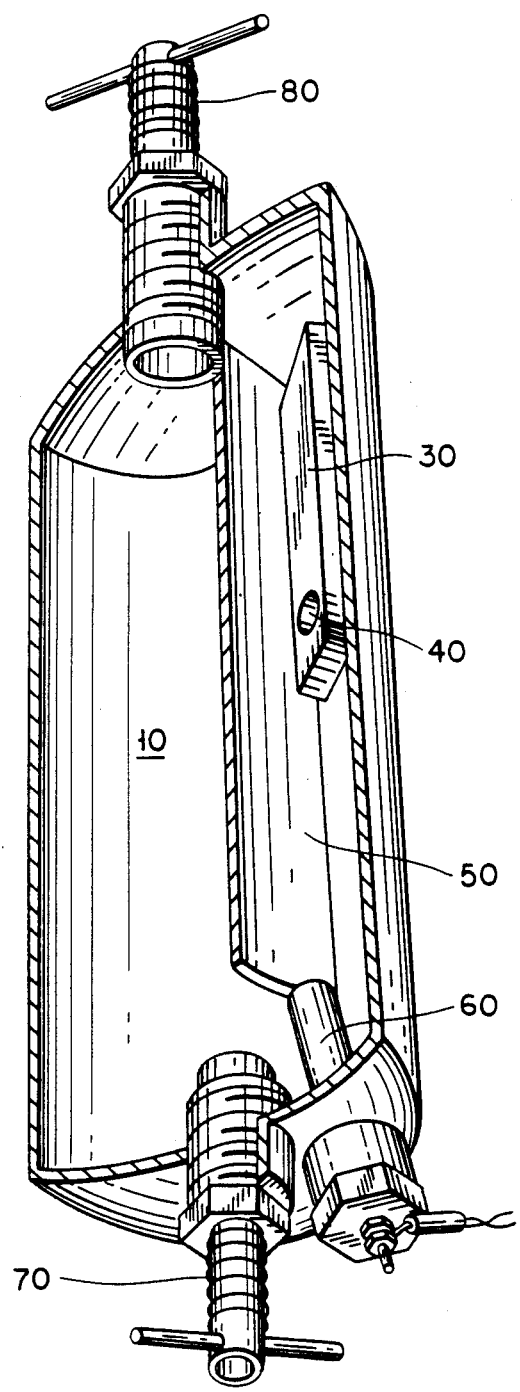
FIG. 3 is a perspective view of the refining apparatus sectioned longitudinally, showing practically all the components of the apparatus.
Figure 4:
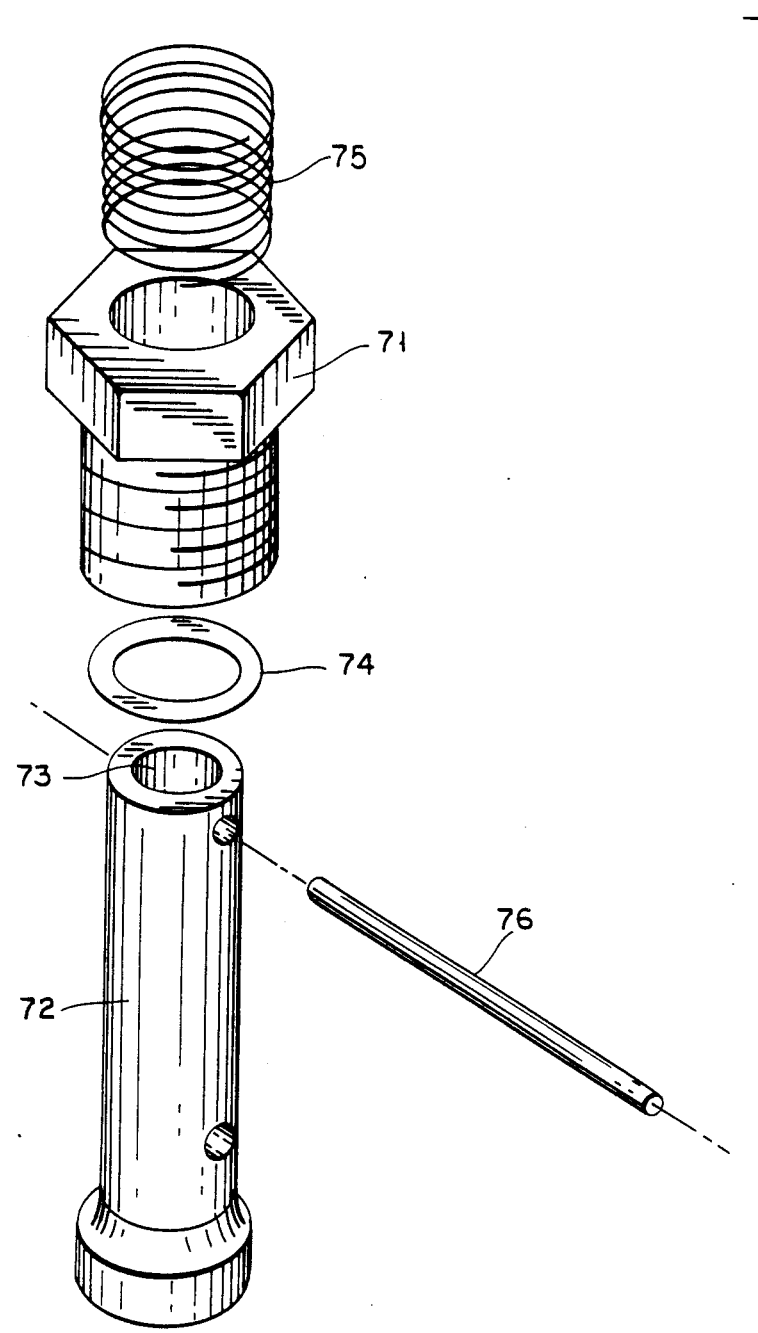
FIG. 4 is a view of one of the blowoff valve of the apparatus shown with its pieces blown up.

The fuel refining apparatus 100 consists of a cylindrical body 10 which includes a fuel intake orifice 20 into which is connected a pipe or hose (in dotted lines) from the fuel storage tank. Once the fuel enters the cylindrical body 10, it is led by an interior fuel flow conduit 30, placed in fluid communication with the orifice 20, from which it leaves by an orifice 40 made in the lower part of the pipe 30. The interior fuel flow conduit is an elongated pipe whose perpendicular arrangement with respect to a longitudinal axis of the intake orifice allows a first impact of the fuel that enters the apparatus through the intake orifice. On flowing out from the interior pipe 30, the fuel hits against a metal plate 50 (sectioned vertically in FIG. 3), which runs diametrally and also substantially longitudinally around the interior of the cylinder. This plate is preheated by an electric resistor 60 which is connected to the engine starter key. Due to the preheating of the plate 50 and the angular relationship maintained by the conduit 30 and the preheated plate 50, the fuel that leaves said pipe 30 and hits against the plate is projected centrifugally to create a turbulence that initially facilitates separation of its components such as water, sulfur, sulfuric acid, etc. which, due to their greater specific weight in relation to the (diesel) fuel tend to be precipitated toward the bottom surface of cylinder 10. Meanwhile, due to its specific weight which is less than 1, the diesel tends to be maintained in the upper part in relation to the other components, whose specific weights are greater than 1, and in the case of the water, the same as the unit.

The apparatus 100 also consists of a lower blowoff valve 70 and an upper blowoff valve 80. The valve 70 is activated manually in order to withdraw from the bottom surface of the cylinder the impurities or components of the diesel that do not carry out favorable functions in the combustion of this fuel, while the valve 80, which can also be activated manually, allows withdrawal of the air that might be stored in the upper part of the cylinder to make drainage of the apparatus more efficient. Each drainage valve (70, 80) is composed of a valve body 71 which is traversed longitudinally by a stem or pin 72 which has a conduit 73 almost along its entire length and an end packing 74 to ensure the air tightness of the valve. The valve is complemented by a spring 75 placed over the valve body 71 and which surrounds the stem 72; furthermore a bolt 76 traverses the stem transversely, keeping the spring under a predetermined pressure.

Finally, the fuel already refined by the apparatus leaves through the fuel exit orifice 90 toward the primary filter from where it later passes to the engine's injection system. Consequently the diesel fuel, preheated and refined, further favors combustion, increasing the yield and use life of the engine.

Based on results of experimentation or tests on the apparatus, we can assure that the retention of the water contained in the fuel, of the sulfuric acid and of oxides generated in the storage tank, as well as impurities such as earth, dirt, etc. is on the order of 95% to 98% for each case.

Even though the invention has been described in detail, it must be clarified that it has been described with respect to certain ways of being used, but this must not be understood as a restriction on the scope of the invention, as these manners of utilization must only be considered restricted by the scopes of the following:

I claim:

1. A fuel purifying apparatus for a vehicle's engine comprising:
   a hollow body having an upper and a lower portion;
   a fuel intake orifice, in the upper portion, in fluid communication with a fuel supply;
   an interior fuel flow conduit within the hollow body and in fluid communication with the fuel intake orifice, said fuel flow conduit having a fuel discharge orifice positioned below the fuel intake orifice;
   a generally flat heat conducting deflector plate located inside the body adjacent to the fuel discharge orifice and connected to a heat source, a longitudinal axis of the plate being positioned parallel to a longitudinal axis of the body and angled relative to the fuel discharge orifice so that fuel discharged from the discharge orifice contacts the plate to create a centrifugal current thereby causing turbulence which separates impurities from the fuel; and
   a fuel exit orifice, in the upper portion, in fluid communication with the vehicle's engine and the purified fuel within the body.

2. The apparatus of claim 1 wherein the body is cylindrically shaped.

3. The apparatus of claim 2, wherein the heat conducting plate is made of metal.

4. The apparatus of claim 3, wherein the interior fuel flow conduit is an elongated pipe whose perpendicular arrangement with respect to a longitudinal axis of the intake orifice allows a first impact of the fuel that enters the apparatus through the intake orifice.

5. The apparatus of claim 3, wherein the deflector plate is heated by an electrical resister within the body that is in contact with the plate.

6. The apparatus of claim 3, wherein there is a first valve for draining the impurities separated out from the fuel and a second venting valve that withdraws the gases from the interior of the apparatus and also facilitates the draining operation of the apparatus.

7. A fuel purifying apparatus for a vehicle's engine comprising:
- a hollow body having an upper and a lower portion;
- a fuel intake orifice, in the upper portion, in fluid communication with a fuel supply;
- an interior fuel flow conduit within the hollow body and in fluid communication with the fuel intake orifice, said fuel flow conduit having a fuel discharge orifice positioned below the fuel intake orifice, a longitudinal axis of the interior fuel flow conduit being positioned parallel to a longitudinal axis of the body;
- a heat conducting deflector plate, adjacent to the fuel discharge orifice and connected to a heat source, a longitudinal axis of the plate being positioned parallel to the longitudinal axis of the body and angled relative to the fuel discharge orifice so that fuel discharged from the discharge orifice contacts the plate to create a centrifugal current thereby causing turbulence which separates impurities from the fuel; and
- a fuel exit orifice, in the upper portion, in fluid communication with the vehicle's engine and the purified fuel within the body.

* * * * *